United States Patent [19]
Erhard

[11] Patent Number: 5,050,553
[45] Date of Patent: Sep. 24, 1991

[54] CAPACITOR IGNITION SYSTEM

[75] Inventor: Werner Erhard, Cadolzburg, Fed. Rep. of Germany

[73] Assignee: Prüfrex-Elektro-Apparatebau Inh. Helga Müller, geb. Dutschke, Cadolzburg, Fed. Rep. of Germany

[21] Appl. No.: 514,992

[22] Filed: Apr. 26, 1990

[30] Foreign Application Priority Data

Apr. 28, 1989 [DE] Fed. Rep. of Germany ....... 3914026

[51] Int. Cl.$^5$ ................................................. F02P 5/15
[52] U.S. Cl. ..................................... 123/418; 123/424; 123/602; 123/600
[58] Field of Search ................. 123/602, 418, 424, 600

[56] References Cited

U.S. PATENT DOCUMENTS

| 4,259,934 | 4/1981 | Leussink et al. | 123/418 |
| 4,553,517 | 11/1985 | Andreasson | 123/418 |
| 4,610,231 | 9/1986 | Nakata et al. | 123/602 |
| 4,722,311 | 2/1988 | Erhard | 123/602 |

FOREIGN PATENT DOCUMENTS 3326278 1/1985 Fed. Rep. of Germany ...... 123/418

Primary Examiner—Andrew M. Dolinar
Attorney, Agent, or Firm—Jordan and Hamburg

[57] ABSTRACT

A capacitor ignition system for internal combustion engines, particularly for lawn mowers, chain saws, abrasive cutting-off machines, etc., has a magnetic generator for triggering a primary firing pulse generator to charge a capacitor. An electronic switch discharges the capacitor via the primary winding of the ignition coil. The primary pulse generator controls a tachometer to address a stored characteristic ignition field program to thereby provide an rpm-dependent delay in the firing pulse relative to the magnetic generator pulse. The characteristic ignition field program has different advance curves for the same rpm under different operating conditions. A switching-over device monitors the operating state of the engine in order to switch over from a starting igntion advance curve to an operating ignition advance curve and back again. The starting ignition advance curve and operating ignition advance curve overlap in a region of the rpm which has the idling rpm as the upper limit. The lower limit of the operating ignition advance curve is always above the starting ignition advance curve and is set to a value of rpm above the rpm achievable by cranking the engine.

10 Claims, 5 Drawing Sheets

CAPACITOR IGNITION SYSTEM

BACKGROUND OF THE INVENTION

The invention is directed to a capacitor ignition system for internal combustion engines, especially for lawn mowers, chain saws, abrasive cutting-off machines, etc., having a magnetic generator and a primary firing pulse generator for charging a capacitor. In this type of system the capacitor is discharged via the primary winding of an ignition coil by an electronic switch. The primary pulse generator is triggered by the magnetic generator. A tachometer addresses a stored characteristic ignition field program to control an rpm-dependent delay in the firing pulse relative to the magnetic generator pulse. The characteristic ignition field program has different advance curves for the same rpm under different operating conditions. A switching-over device is provided for switching over from a starting ignition advance curve to an operating ignition advance curve and back again.

In the capacitor ignition system of the above type, as disclosed in German Patent Application 38 17 471.5, a switching-over device that monitors the operating state is provided in order to switch over to an operating advance curve for which the advance increases as the rpm decreases, as the advance increases with increasing rpm and when a specified rpm is reached. After the engine has stopped for a specified time, the curve is switched back to the starting advance curve by means of a time function element that is activated by the stoppage of the engine. The switch-over point of the advance curve is below the idling rpm.

Such a construction for a capacitor ignition system accomplishes first of all that when the engine is cranked, essentially the starting advance curve is run through, for which the ignition time is relatively late in comparison to the ignition time for an operating rpm of about 8,000 for a chain saw or an abrasive cutting-off machine. This prevents too early an ignition pulse from driving the engine backward and simultaneously pulling the starting rope out of the hands of the operator. Of course the advance can be programmed in any way, so that it can be adapted to the particular use and also for the intended equipment. Running in the reverse direction can thus always be avoided by selecting the optimum advance for the particular engine.

If the gas lever is let go suddenly at full throttle (reach-me-down), the danger exists that the rpm will drop below the idling rpm and the engine will stall. For this reason, an operating advance curve which has been addressed, which deviates from the starting advance curve above the idling rpm and which rises with reverse slope toward lower rpm, is provided in the characteristic ignition field program. As soon as the engine starts up, it reaches the idling speed of, for example, 3,000 rpm. At the same time, the change-over point, that is, the point at which the two advance curves deviate from one another and which lies, for example, at 3,000 rpm, is traversed and the digital capacitor ignition system automatically switches over to the operating advance curve. If, however, the engine speed now drops below the idling speed, the engine receives early ignition pulses. This causes the engine output and thus the rpm to be increased, so that the engine does not stall.

If the engine is turned off and has been switched off for more than a specified stoppage time, this stoppage time being considered primarily as a safety measure, the system is switched with delay via a time-function element back to the starting advance curve, by way of a sensor, for example, a tachometer or an engine temperature gauge, which detects this operating state.

Admittedly, this prior capacitor ignition system reliably prevents the engine from stalling as the rpm drops. However, due to its rigid switching-over behavior, it is no longer adaptable to the respective requirements and, above all, can also not be operated by the user alternately for other functions of the ignition advance.

SUMMARY OF THE INVENTION

It is therefore an object of the invention to provide a capacitor ignition system of the above type, wherein safety when starting, especially in manually operated equipment, such as abrasive cutting-off machines, etc., is increased even further.

Pursuant to the invention, this object is accomplished by providing a system wherein the starting ignition advance curve and the operating ignition advance curve overlap over an rpm range which has the idling rpm as the upper limit. The lower limit of the operating ignition advance curve, which always lies above the starting ignition advance curve, is set at an rpm value which lies above the starting rpm that is achievable by cranking the engine.

In contrast to the ignition system of the above-described type of the prior German patent application, a branching site, at which the starting ignition advance curve joins the operating ignition advance curve, is not provided for the inventive capacitor ignition system. Instead, these two ignition advance curves are completely separate from one another. The development of the present invention is also directed primarily not at preventing the engine from stalling as the rpm decreases below the rpm at the point at which the two ignition advance curves branch, but rather at even more reliably preventing injuries to users of hand-held power machines, such as abrasive cutting-off machines, chain saws, etc., particularly while cranking the engine by hand basically by using a starter rope.

Of course, with the capacitor ignition system of the present invention also, the idling speed of about 3,500 rpm is below the release rpm for the centrifugal coupling. Accordingly, the centrifugal force coupling can never close while the engine is operating according to the starting ignition advance curve, and thus cannot set either the abrasive cutting-off machine or the chain saw in operation. On the other hand, the operating ignition advance curve is programmed so that it supplies firing pulses only when the rpm lies above the starting rpm, so that the maximum rpm achievable when cranking the engine cannot release any ignition pulse. As a result, the engine cannot be started in the full throttle position. The danger of injury would be very high if the engine were to be started and revved up immediately because the operator can hold the engine at that time with only one hand. The other hand is, after all, still on the starter rope. Only by the provision of the switching-over device in accordance with the invention, which device may be, for example a switch corresponding to switch S1 of the prior patent application, is there a changeover from the starting ignition advance curve to the operating ignition advance curve. This time of switching over, however, occurs so late that the user meanwhile long ago has let go of the starter rope and has taken hold of the implement with the second hand. To use the already-addressed mechanical switch on the handle of the implement for this switching over, it is necessary to hold the implement with both hands before the switching over. For other implements, it may, however, be entirely advantageous not to provide a mechanical switch on the handle of the implement and, instead, to control the switching over by a software program.

When the engine is started by hand, only a very low rpm is achieved. Moreover, the engine runs very untrue, because the compression of the engine strongly decelerates the course of motion during the manual start in a particular angular range.

To remedy this poor starting behavior in a capacitor ignition system in accordance with the invention, provisions are additionally made in a further refinement of the invention so that the starting ignition advance curve supplies ignition sparks only from a limiting rpm onward, which lies above the starting rpm, between 1,000 and 2,000 rpm and preferably at about 1,500 rpm and so that only a starting ignition spark, produced by rotating magnet wheel at a specified place after it passes through the top dead center of the engine piston, is available up to this rpm.

By means of this quasi simple rigid generation of ignition sparks in a starting range with disconnection of the electronics which take over the release of the ignition only above a given, limiting rpm, it is moreover achieved that when the engine is braked suddenly in the starting range of the rpm, an ignition pulse is released only when the top dead center of the engine piston is exceeded. As a result, backfiring of the engine is precluded completely. In accordance with a first embodiment of the present invention for generating this starting ignition spark, an additional triggering coil is provided which is positioned after the ignition coil in the direction of rotation of the magnet wheel and which preferably is connected in series with a diode, the series circuit being connected in parallel with the output of the electronic primary pulse generator.

If the electronic primary pulse generator is programmed so that it releases no ignition pulse up to a specified limiting rpm of, for example, 1,500, then only the voltage pulse of the additional triggering coil becomes effective up to this time. The ignition pulse is released each time that the permanent magnet of the magnet wheel passes by the triggering coil. Above the limiting rpm, the electronic circuit then supplies the control pulse for the electronic switch, preferably a thyristor, which discharges the ignition coil. If this control pulse is at the time of the voltage pulse of the triggering coil, the ignition is released by the electronic circuit, that is, by the primary electronic pulse generator, and the triggering pulse remains ineffective, since the capacitor, after release of the ignition pulse, has already been discharged. Therefore the pulses continue to be supplied to the thyristor, as in the past.

If this is to be avoided, provisions can also be made so that the starting ignition sparks of the triggering coil are short-circuited via an electronic switch, preferably a transistor, which, when the given rpm is reached, is switched by the electronic primary pulse generator to the electronic firing pulse advance.

Instead of such a separate triggering pulse to generate the starting ignition spark while bypassing the electronic primary pulse generator, provisions can also be made pursuant to a second embodiment of the present invention to derive the starting ignition spark from the negative slope of the second positive pulse induced by the magnet wheel in the ignition coil. In this case also, it is ensured that since the position of the magnet wheel always corresponds to a particular position of the engine piston, there cannot be any ignition before the top dead center of the piston and the engine can therefore not kick back when started by hand.

BRIEF DESCRIPTION OF THE DRAWINGS

Further advantages, characteristics and details of the invention arise out of the subsequent description of some examples of the operation, as well as from the drawings, in which the following is shown.

DESCRIPTION OF THE PREFERRED EMBODIMENTS

Figure 2:
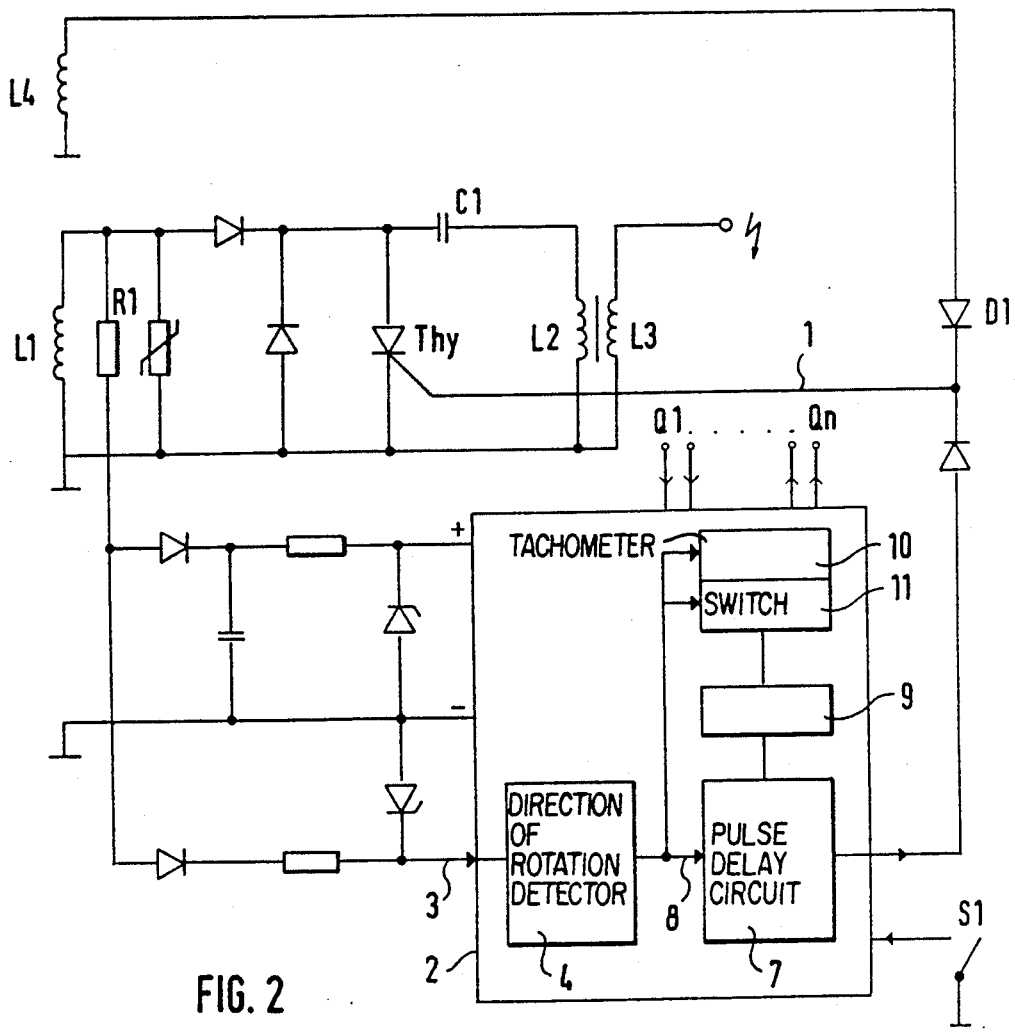
FIG. 2 is a circuit diagram of a capacitor ignition system with a separate triggering coil for the ignition of starting ignition sparks.
Figure 5:
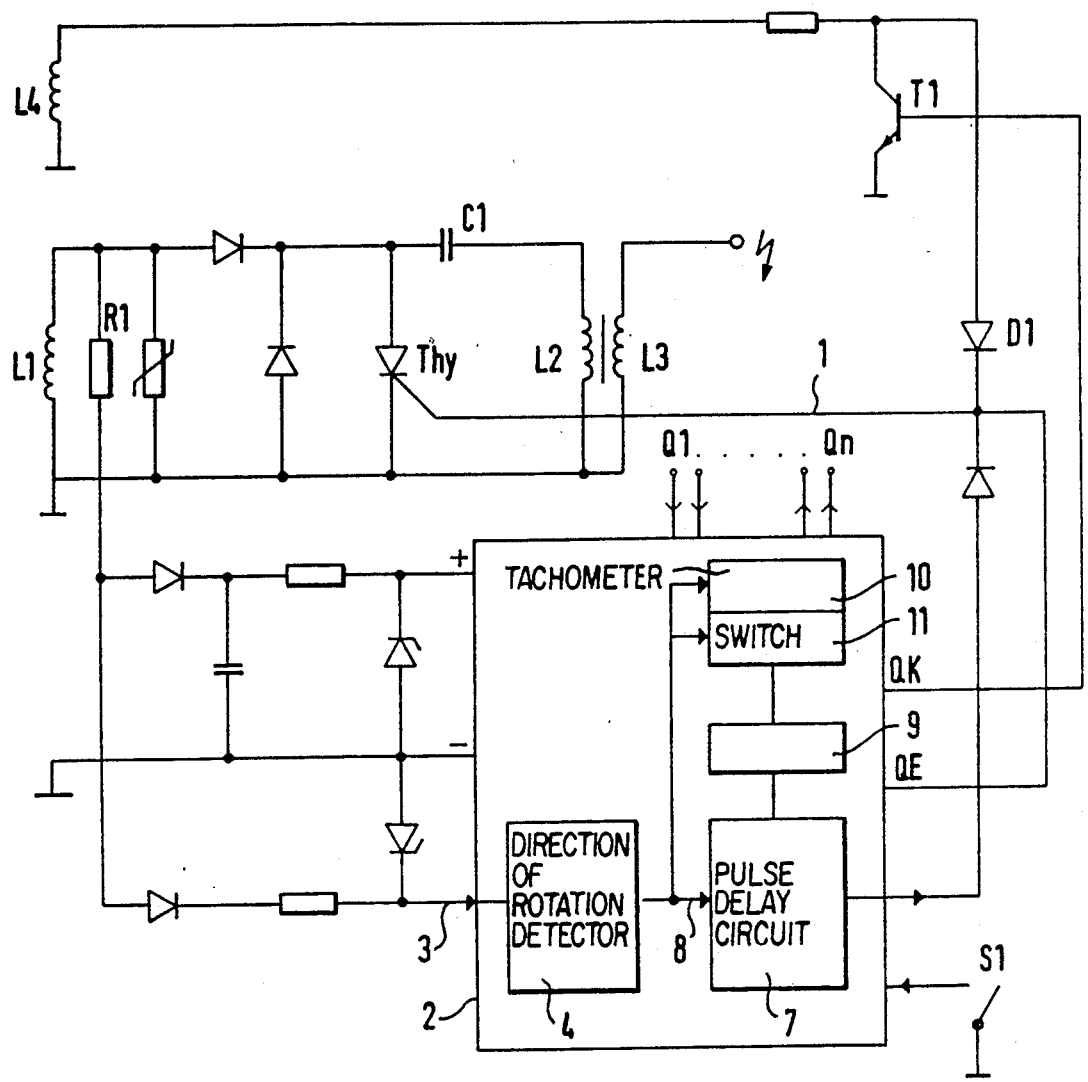
FIG. 5 illustrates a modification of the capacitor ignition system of FIG. 2 with the starting ignition spark supression at a higher rpm.

FIG. 2 illustrates the construction of a conventional capacitor ignition system, basically as disclosed in the abovedescribed German Patent Application P 38 17 471.5 with the exception of the triggering coil L4 and the series diode D1, in which a signal is induced in the charging coil L1 by a passing magnet wheel. This signal charges the charging capacitor C1, which is connected in series with the primary winding L2 of the ignition coil. At the desired times, the thyristor Thy is switched by an ignition pulse on line 1 to discharge the capacitor C1 via the primary winding L2 of the ignition coil, so that an ignition pulse can be induced in the secondary winding L3 of the ignition coil. The circuit shown in the lower parts of FIGS. 2 and 5 is used to generate the ignition pulse. The elements disposed outside of the framed delay part 2 represent the power supply by means of which a DC supply voltage is produced from the voltage induced by the magnet wheel and diverted via the resistance R1 from the charging coil L1. The signal induced in the charging coil L1 is applied as an input signal via the input 3 to the circuit 2, which, to begin with, has a direction of rotation detector 4. This direction of rotation detector detects the number of positive and/or negative half waves of the input pulse, from which the direction of rotation of the magnet wheel can be determined. The direction of rotation detector is constructed simply to output the input pulse supplied to input 3 only if the internal combustion engine is running forward. This pulse is now supplied to the actual pulse delay circuit 7, which outputs the ignition pulse at the output via line 1 to the thyristor. The extent of the delay of the ignition signal supplied to the input 8 of the pulse delay circuit, which is essentially synchronous with the input signal at the input 3, is dependent on the rpm as provided in the stored characteristic ignition diagram curve program in storage 9. The output signal of the direction of rotation detector is supplied, at first, to a tachometer 10, the output of which is applied by way of switching-over element 11 to the characteristic ignition diagram curve program, and the output of the program in the storage is applied to the delay circuit 7.

Figure 1:
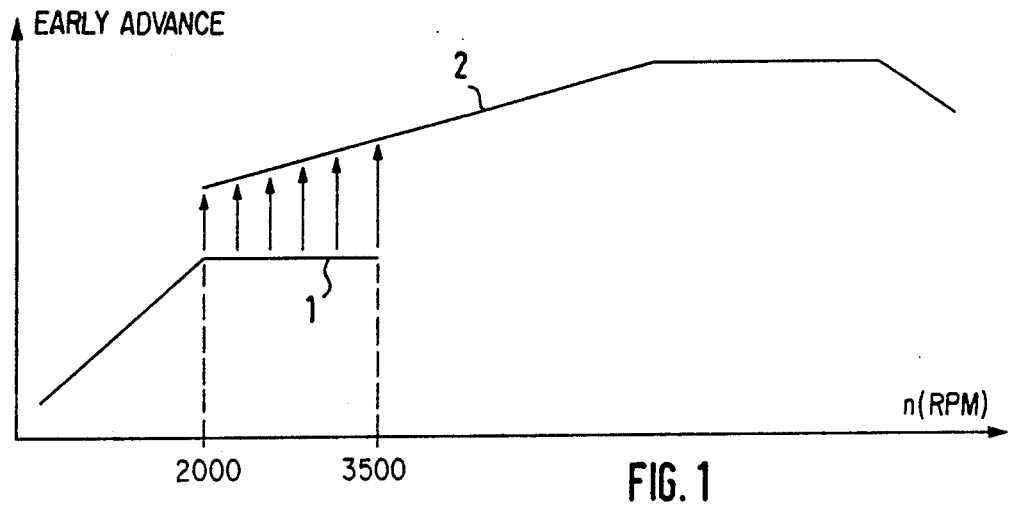
FIG. 1 is a diagrammatic representation of the capacitor ignition advance curves of an inventive capacitor ignition system.

Aside from the starting ignition advance curve 1, the inventive characteristic ignition diagram program, as shown in FIG. 1, contains an operating ignition advance curve 2. The starting ignition advance curve 1 moreover is programmed so that above the idling rpm, which is at 3,500 rpm in the example of the operation shown, no ignition is released. Consequently, the idling rpm is limited to this value of 3,500 rpm and the centrifugal coupling, which usually engages in motor-driven implements, such as chain saws or abrasive cutting-off machines, at 4,000 rpm, cannot close. With the help of the switching-over device, preferably the switch S1 in FIGS. 2 and 5, it is possible to switch over to the operating ignition advance curve 2 at a convenient rpm below 3,500. This curve is programmed so that the maximum rpm achievable when cranking the engine (about 2,000 rpm) does not release any ignition pulses. As a result, the engine cannot be started in the full-throttle position. The danger of injury would be very great if the engine were to be revved up immediately when it is started, because the operator at this time can hold the implement only with one hand. The second hand, while starting the engine, after all is still on the starter rope. If the engine is already running at the idling speed of about 2,000 to 3,000 rpm the actuation of the gas lever to the full-throttle position causes a changeover to the advance curve 2. Advance curves 1 and 2 overlap in the region of 2,000 rpm to 3,000 rpm. The operating ignition advance curve 2 is designed so that the ignition time is always earlier than in the case of the starting ignition advance curve. As a result, the engine is accelerated particularly well upon the actuation of switch S1—or a possible automatic switching-over device, which can be realized by software programming.

When starting the engine by hand, basically only a very low rpm is achieved. In addition, the engine runs very untrue, because the compression of the engine strongly decelerates the course of motion during the hand start in a particular angular range. For this reason, the position of the crankshaft of the engine, starting out from a particular reference point, can hardly be calculated in advance in the case of hand-start rpms.

Figure 3:
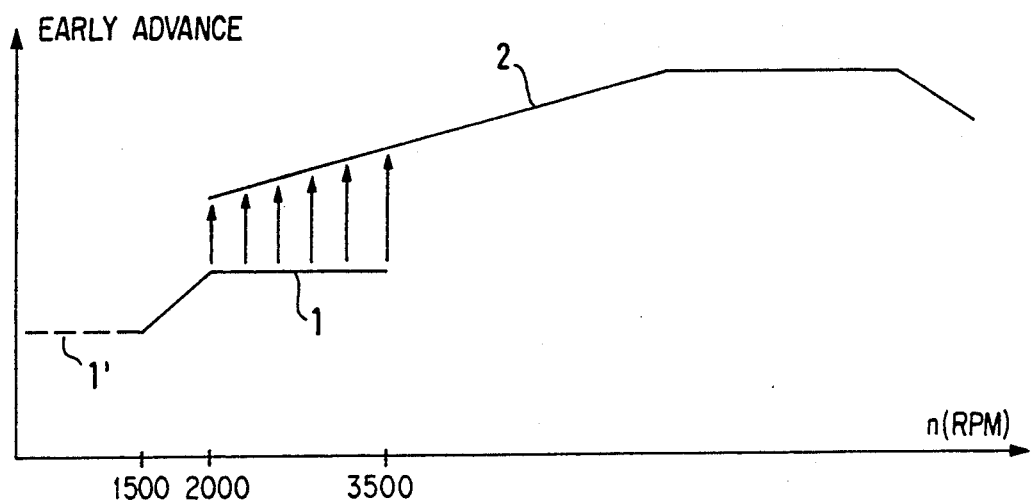
FIG. 3 is a diagrammatic representation of the ignition advance curves of the ignition system of FIG. 2.
Figure 4:
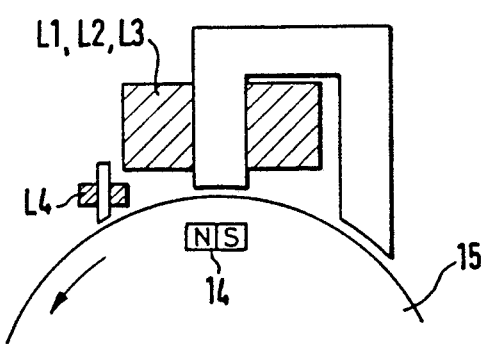
FIG. 4 is a schematic representation of the arrangement of the triggering coil of the circuit of FIG. 2 relating to the ignition coil.

To eliminate these difficulties, provisions are made in a modified example of the operation of FIGS. 2-4 that an ignition pulse is released without delay at a particular position of the magnet wheel. This can be done by providing a separate triggering coil L4 for the starting rpm region. From a specified rpm upward, the electronic circuit 2 then takes over the release of the ignition pulses.

It can be seen from FIG. 4 how the permanent magnet 14 of the magnet wheel 15 passes first of all by the coils L1, L2 and L3 and subsequently passes the separate triggering coil L4. It can be seen in FIG. 2 that the electronic circuit 2, as well as the triggering coil L4, can fire the thyristor Thy.

If the electronic circuit 2 is now programmed so that it does not release any ignition pulses up to an rpm of about 1,500, then only the voltage pulse of the triggering coil L4 becomes effective in this range. This is indicated in FIG. 4 by branch 1', which is shown as a broken line. This horizontal branch, indicated by a broken line and having no early or late advance, is thus based exclusively on the starting ignition pulses which come from the triggering coil L4. As for the rest, the starting ignition advance curve 1 and the operating ignition advance curve 2 extend as shown in FIG. 1. The starting ignition advance curve 1 is only cut off below 1,500 rpm by appropriate programming, as discussed above, and replaced by the ignition advance curve 1' of the triggering coil L4, as indicated by the broken line.

The ignition pulse is released each time that the permanent magnet passes by the triggering, coil L4. From 1,500 rpm upward, the electronic circuit also supplies a control pulse for the thyristor. If these control pulses are at the time of the voltage pulse of the triggering coil L4, the ignition pulse is released by the electronic circuit 2 and the triggering pulse L4 remains ineffective, although its pulses continue to arrive. FIG. 5 shows an example of the operation, which represents a modification of the arrangement of FIG. 2 and in which the triggering pulse from the coil L4 is short-circuited by the electronic circuit 2 via the output of QK by energizing the transistor T1. This may become necessary particularly if every ignition pulse is to be suppressed in order to limit the rpm. The electronic circuit is informed via the input QG when an ignition pulse is released. For example, the electronic circuit 2 can block the input 3 during the ignition pulse, in order to exclude pulses that interfere with the rpm measurement.

The inventive circuit arrangement of FIGS. 2 and 5 has the advantage that when the engine is braked suddenly in the starting range of the rpm, an ignition pulse is released only when the top dead center of the engine piston is exceeded. As a result, any backfiring of the engine is prevented completely.

Figure 6:
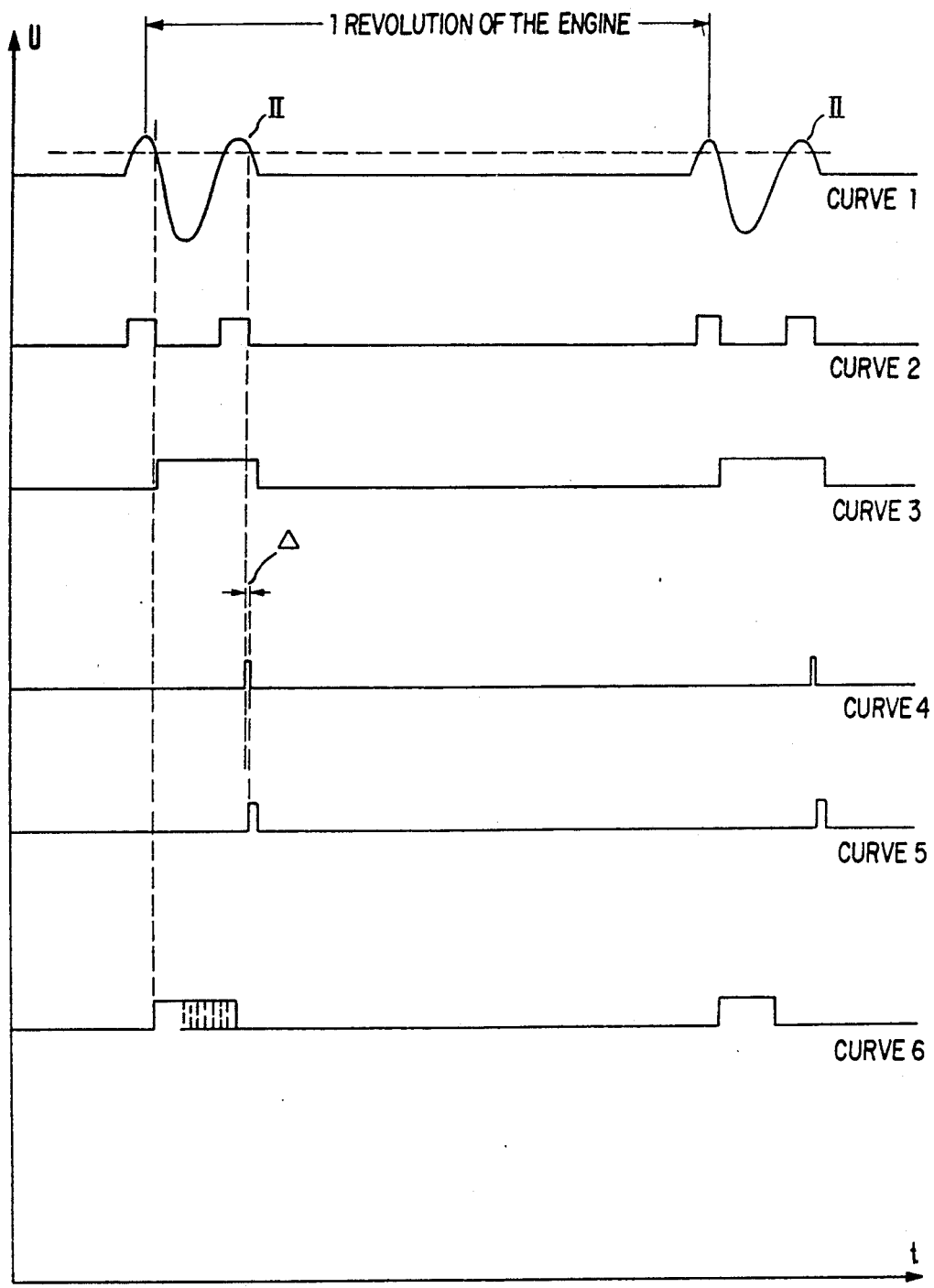
FIG. 6 is a representation of the signals of a capacitor ignition system, in which the starting ignition sparks are derived from the signals induced in the ignition coil.

FIG. 6 is a diagram of the corresponding pulses of a further variation of the circuit diagram of FIGS. 2 and 5, which avoids the use of a separate triggering coil L4 for the generation of the special starting ignition sparks in the region below 1,500 rpm. For this purpose, the negative slope of the second positive pulse II (FIG. 6, curve 1), which is generated by the magnet wheel in the ignition coil, is used to form the starting ignition spark in the starting range of the rpm. Curve 2 shows the pulses derived from the first and second positive pulses after appropriate pulse shaping. Curve 3 shows the programmed time within which the second positive pulse must arrive in the manual starting range of the rpm (negative flank). The programmed delay time for the manually starting rpm is represented by curve 4. The delay time is started with the second positive pulse and is very small or tends toward zero. Accordingly, when starting manually, the ignition pulse can be released directly by the second positive pulse. Curve 5 shows how the thyristor is fired, since the second positive pulse (the negative slope of which) was already there before the end of the delay time.

Finally, the programmed delay time with the engine running is indicated in FIG. 6. The broken lines indicate that the delay time can also be programmed to be shorter (early advance of the ignition time possible as the rpm increases).

Figure 7:
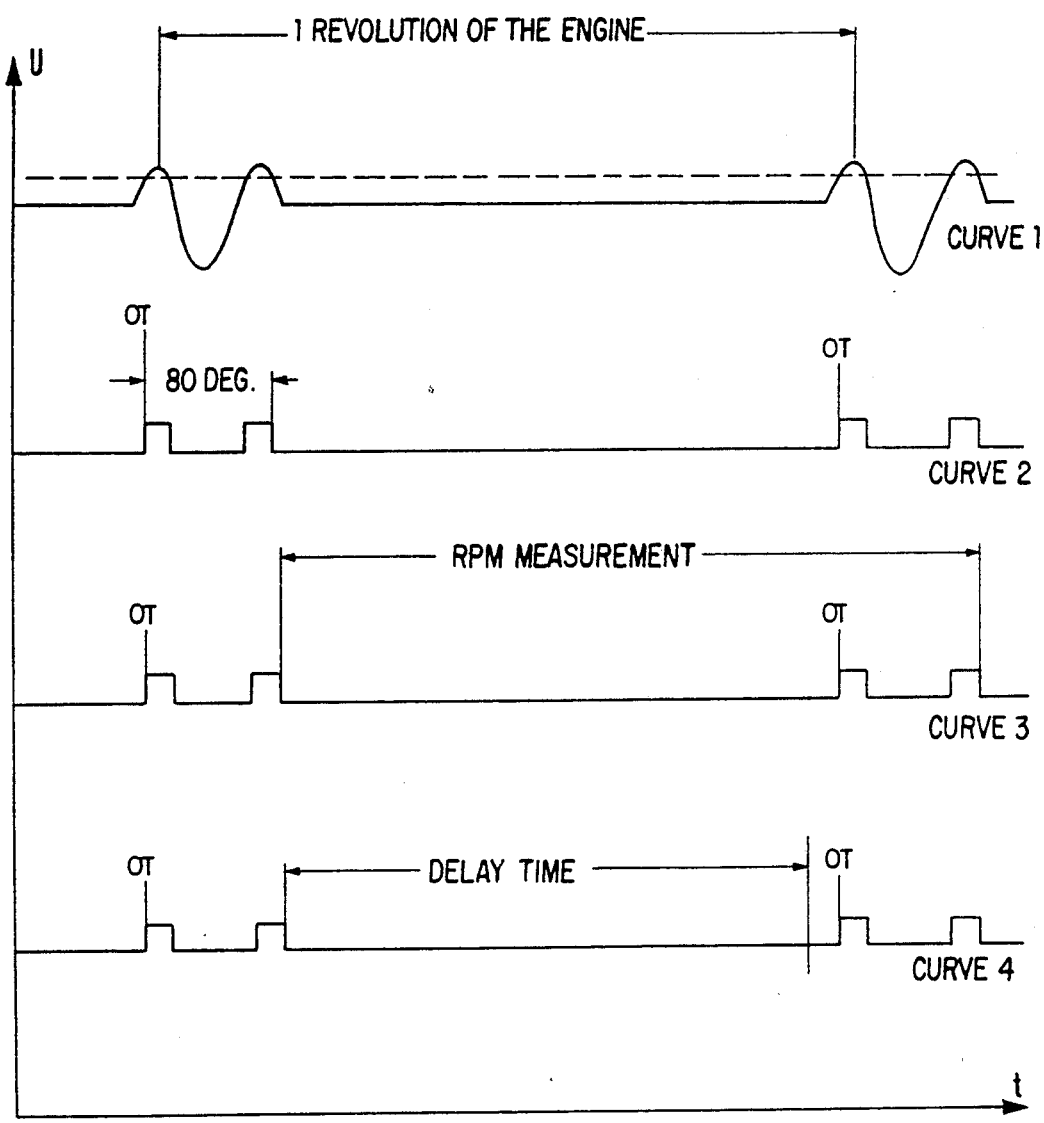
FIG. 7 is a representation of the signals of a capacitor ignition system, which is modified somewhat from that of FIG. 6 and in which the starting ignition sparks are derived from the signals induced in the ignition coil.

FIG. 7 shows a further technique for dispensing with the separate triggering coil L4 to generate the special starting ignition sparks in the range of rpms below 1,500. Curve 1 of FIG. 7 once again shows the course of the voltage, which is produced by coil L1 and supplied to the electronics. Two positive pulses per revolution of the engine are obtained from this curve, the distance between the rising slope of the first pulse and the declining slope of the second pulse being about 80 degrees (curve 2). In the starting range of the rpm of the engine, the ignition spark is now generated directly by the rising slope of the first pulse. The engine, moreover, is designed so that this ignition spark is released at top dead center. As a result, any backfiring of the engine is precluded no matter how low the starting rpm. As already described elsewhere, the engine runs very untrue at the rpm of manual starting. If the ignition is released after a certain delay time from a reference point at which the rpm is measured, the latter can change greatly during the delay time and the calculated ignition time, which should lie at a particular position of the crankshaft, is no longer correct.

These difficulties cannot arise if the ignition pulse is released directly by the rising slope of the first pulse, because the pulses are generated only at a particular speed and at a particular position of the crankshaft.

As soon as the engine has started, the idling speed is about 2,000 to 3,000 rpm.

For a sensible mode of operation of the engine, the ignition must occur for these rpms before top dead center. For this purpose, the engine rpm is measured already from the first revolution onward with the declining slope of the second pulse (curve 3 in FIG. 7). This measurement point is at about 80 degree after top dead center. At this point, there is no extreme decrease in the rpm of the engine. The negative slope of the second pulse can therefore also be used to evaluate the rpm. From this reference point, a delay time, which corresponds to the rpm and after which the ignition pulse is released, is set by the ignition circuit. This ignition time can now be set at any time before top dead center (curve 4 of FIG. 7).

The invention is not limited to the examples of the operation shown. For example, it is possible to program some additional modes of operation into the electronics. For example, it is possible to switch over to an additional operating advance curve which is designed specifically so that the engine cools off This second ignition advance curve could also, if necessary, be designed so that the limitation of the rpm is transferred to a smaller value of the rpm by switching off the spark, the changing over to this additional operating ignition advance curve preferably taking place by way of an engine temperature sensor. It is self-evident that a function of the engine temperature sensor can of course also advisably be provided so that no ignition whatsoever is released when a particular temperature is exceeded, so that the engine dies, in order to avoid damage from overheating.

Finally, it is also within the scope of the invention to suppress the ignition during several revolutions as soon as the engine exceeds a particular temperature. In this manner, because of the fluctuating rpm of the engine, the attention of the user would be drawn to the hot engine. Suitable remedies could then be taken either by changing over to a different program or by switching off the engine completely.

Although the present invention has been described through specific terms, it should be noted here that the described embodiments are not necessarily exclusive and that various changes and modifications may be imparted thereto without departing from the scope of the invention, which is limited solely by the appended claims.

What I claim is:

1. In a capacitor ignition system for an internal combustion engine having a magnetic generator, a primary firing pulse generator triggered by the magnetic generator for charging a capacitor, an electronic switch connected to discharge the capacitor via the primary winding of an ignition coil, storage means for storing a characteristic ignition field program including starting ignition advance characteristics and operating ignition advance characteristics having different advance curves for the same engine rpm under different conditions, means for delaying the output of said primary firing pulse generator to produce a firing pulse, a tachometer responsive to the output of the primary pulse generator and stored characteristics in said storage means for controlling said delaying means to effect an rpm-dependent delay in the firing pulse relative to the state of the magnetic generator, and a switching over device responsive to the operating conditions of the engine for selectively controlling the delaying means as a function of the starting and operating ignition advance characteristics, the improvement wherein the starting and operating ignition characteristics overlap in a given rpm range of said engine, said overlapping range having the idling rpm of the engine as an upper limit, the value of the operating ignition advance curve being always greater than the value of the starting ignition advance curve for any engine rpm, the operating ignition advance characteristic having a lower limit rpm which is set at a value of the engine rpm that is higher than the rpm achievable by cranking the engine, said switching over device comprising a user accessible mechanical switch.

2. The capacitor ignition system of claim 1, wherein the switching over device comprises a software program in said storage means.

3. The capacitor ignition system of claim 1, wherein the magnetic generator comprises a rotating magnet wheel, the starting ignition advance characteristic comprises means for releasing ignition pulses only above a limiting rpm above the starting rpm in the range of 1,000 to 2,000 rpm, and further comprising second means for producing an ignition pulse at a given position of said magnet wheel after passing through top dead center, whereby at rpm up to said starting rpm, the only firing pulses available for said engine are ignition pulses produced by the second means.

4. The capacitor ignition system of claim 3 wherein said starting ignition is 1,500 rpm.

5. The capacitor ignition system of claim 3, wherein said second means comprises an additional triggering coil, which follows the ignition coil in the direction of rotation of the magnet wheel, for producing the starting ignition sparks.

6. The capacitor ignition system of claim 5, wherein the triggering coil is connected in a series circuit with a diode, the series circuit being connected in parallel with the output of the primary pulse generator.

7. The capacitor ignition system of claim 6, comprising electric switch means connected to short circuit the starting ignition pulses produced by said second means, and means response to a predetermined changeover rpm for controlling said electric switch means.

8. The capacitor ignition system of claim 7 wherein said switch means comprises a transistor.

9. The capacitor ignition system of claim 3, wherein said second means comprises means for deriving starting ignition pulses from the negative slope of the second positive pulse induced in the ignition coil by the magnet wheel.

10. The capacitor ignition system of claim 3, comprising means for deriving starting ignition pulses from the positive slope of the first positive pulse induced in the ignition coil by the magnet wheel.

* * * * *